United States Patent
Gupta et al.

(10) Patent No.: US 10,839,093 B2
(45) Date of Patent: Nov. 17, 2020

(54) LOW LATENCY ACCESS TO PHYSICAL STORAGE LOCATIONS BY IMPLEMENTING MULTIPLE LEVELS OF METADATA

(71) Applicant: Nutanix, Inc, San Jose, CA (US)

(72) Inventors: Karan Gupta, San Jose, CA (US); Rishi Bhardwaj, San Jose, CA (US); Amod Vilas Jaltade, San Jose, CA (US); Gowtham Alluri, San Jose, CA (US); Pavan Kumar Konka, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 425 days.

(21) Appl. No.: 15/965,676

(22) Filed: Apr. 27, 2018

(65) Prior Publication Data

US 2019/0340374 A1    Nov. 7, 2019

(51) Int. Cl.
*G06F 16/907*    (2019.01)
*G06F 21/62*    (2013.01)
(Continued)

(52) U.S. Cl.
CPC ........ *G06F 21/6218* (2013.01); *G06F 3/0664* (2013.01); *G06F 9/45558* (2013.01);
(Continued)

(58) Field of Classification Search
CPC .................................................. G06F 16/907
See application file for complete search history.

(56) References Cited

U.S. PATENT DOCUMENTS 7,636,801 B1    12/2009    Kekre et al.
7,801,864 B2    9/2010    Prahlad et al.
(Continued)

FOREIGN PATENT DOCUMENTS

EP    3382560 A1    10/2018
JP    6398693 B2    10/2018
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Kris E Mackes
(74) *Attorney, Agent, or Firm* — Vista IP Law Group, LLP

(57) ABSTRACT

Systems for low-latency data access in distributed computing systems. A method embodiment commences upon generating a first storage area in local storage of a first computing node. Access to the first storage area is provided through the first computing node. A second storage area is generated wherein the second storage area comprises a first set of metadata that comprises local storage device locations of at least some of the local storage areas of the first storage area. A set of physical access locations of the second storage area is stored to a database that manages updates to the second set of metadata pertaining to the second storage area. Accesses to the first storage area are accomplished by querying the database retrieve a location of the second set of metadata, and then accessing the first storage area through one or more additional levels of metadata that are node-wise collocated.

24 Claims, 14 Drawing Sheets

(51) Int. Cl.
*G06F 3/06* (2006.01)
*G06F 9/455* (2018.01)
*H04L 29/08* (2006.01)
*G06F 16/27* (2019.01)

(52) U.S. Cl.
CPC ............ *G06F 16/27* (2019.01); *G06F 16/907* (2019.01); *H04L 67/1097* (2013.01); *G06F 2009/45562* (2013.01); *G06F 2009/45583* (2013.01); *G06F 2009/45595* (2013.01)

(56) References Cited

U.S. PATENT DOCUMENTS

| | | | |
|---|---|---|---|
| 8,095,577 | B1 | 1/2012 | Faibish et al. |
| 8,156,123 | B2 | 4/2012 | Tribble et al. |
| 8,285,681 | B2 | 10/2012 | Prahlad et al. |
| 8,352,472 | B2 | 1/2013 | Prahlad et al. |
| 8,549,518 | B1 | 10/2013 | Aron et al. |
| 8,601,473 | B1 | 12/2013 | Aron et al. |
| 8,615,534 | B2 | 12/2013 | Cannon et al. |
| 8,850,130 | B1 | 9/2014 | Aron et al. |
| 9,098,562 | B2 | 8/2015 | Bettger et al. |
| 9,600,192 | B2 | 3/2017 | Chambliss et al. |
| 9,772,866 | B1 | 9/2017 | Aron et al. |
| 9,858,013 | B1 | 1/2018 | Srivastav et al. |
| 9,880,750 | B1 | 1/2018 | Ravindran et al. |
| 9,946,657 | B1 | 4/2018 | Muthukkaruppan et al. |
| 10,126,977 | B2 | 11/2018 | Sinha et al. |
| 2007/0179981 | A1 | 8/2007 | Vincent |
| 2009/0006409 | A1 | 1/2009 | Yang et al. |
| 2009/0138444 | A1 | 5/2009 | Kim et al. |
| 2009/0292947 | A1 | 11/2009 | Ganesh et al. |
| 2010/0267374 | A1 | 10/2010 | Armstrong et al. |
| 2012/0246382 | A1* | 9/2012 | Wade ............... G06F 3/0608 711/6 |
| 2013/0073589 | A1 | 3/2013 | Smith et al. |
| 2014/0181004 | A1 | 6/2014 | Said et al. |
| 2014/0279941 | A1 | 9/2014 | Atkisson |
| 2015/0039629 | A1 | 2/2015 | Theeten et al. |
| 2015/0178105 | A1* | 6/2015 | Graham ............... G06F 8/658 718/1 |
| 2015/0227521 | A1 | 8/2015 | Levari et al. |
| 2015/0286495 | A1 | 10/2015 | Lee |
| 2016/0062674 | A1 | 3/2016 | Benight et al. |
| 2016/0070623 | A1* | 3/2016 | Derk ............... G06F 11/1469 714/6.23 |
| 2016/0124676 | A1 | 5/2016 | Jain et al. |
| 2018/0284995 | A1* | 10/2018 | Dantkale ............... G06F 3/065 |

FOREIGN PATENT DOCUMENTS

| | | |
|---|---|---|
| WO | WO 2011023619 A1 | 3/2011 |
| WO | WO 2016054212 A1 | 4/2016 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Ellis, Jonathan. "2012 in Review: Performance" (Jan. 14, 2013), DataStax, from https://www.datastax.com/dev/blog/2012-in-review-performance.

Lakshman, Avinash, et al. "Apache Cassandra" (Jul. 2008), from https://en.wikipedia.org/wiki/Apache_Cassandra.

Petla, S. et al. "HBA: Distributed Metadata Management for Large Cluster-Based Storage Systems" (2012), vol. 1, Issue 3, *International Journal of Engineering Innovation & Research*, from http://web.eece.maine.edu/zhu/papers/TPDS08_HBA.pdf.

Manzanares, A. "Energy Efficient Prefetching with Buffer Disks for Cluster File Systems" (2010), *2010 39th International Conference on Parallel Processing*.

Zhu, Y. et al. "HBA: Distributed Metadata Management for Large Cluster-Based Storage Systems" (Apr. 2008), vol. 19, No. 4, IEEE Transactions on Parallel and Distributed Systems.

Apache: "What is Cassandra?", Copyright 2016, pp. all.

Cano, I. et al., "Curator: Self-Managing Storage for Enterprise Clusters", *14th USENIX Symposium on Networked Systems Design and Implementation, NSDI '17*, (Mar. 27, 2017).

Non-Final Office Action dated Jan. 9, 2020 for related U.S. Appl. No. 15/965,656.

Bravo et al., "Saturn: a Distributed Metadata Service for Causal Consistency," ACM, Apr. 2017, 16pg. (Year: 2017).

Yu et al., "Efficient Data Management in Spatial Data Warehouses," Rutgers, 2006, 24pg. (Year: 2006).

Notice of Allowance dated Jul. 1, 2020 for related U.S. Appl. No. 15/965,656.

* cited by examiner

LOW LATENCY ACCESS TO PHYSICAL STORAGE LOCATIONS BY IMPLEMENTING MULTIPLE LEVELS OF METADATA

RELATED APPLICATIONS

The present application is related to co-pending U.S. patent application Ser. No. 15/965,656 titled "EFFICIENT METADATA MANAGEMENT", filed on even date herewith, which is hereby incorporated by reference in its entirety.

FIELD

This disclosure relates to distributed computing, and more particularly to techniques for low latency access to data in distributed storage systems.

BACKGROUND

Modern computing and storage systems are under ever increasing demands to manage inexorably larger and larger volumes of data. For example, "big data" is often collected from a myriad of information sensing devices (e.g., mobile phones, online computers, RFID tags, sensors, etc.) and/or operational sources (e.g., point of sale systems, accounting systems, CRM systems, etc.). Many modern computing systems further include virtualized entities (VEs)—such as virtual machines (VMs) or executable containers—to improve the utilization of computing resources. Some computing and storage systems might scale to several thousands or more autonomous virtual machines or other virtual entities, with each such virtual entity having a corresponding set of entity management data (e.g., entity metadata) as well as a set of workload data. Low latency access to these thousands or millions (or more) entities need to be managed by the computing and storage system, even as the storage system continues to grow.

The highly dynamic storage capacity storage I/O (input/output or TO) demands of these thousands of VEs has brought to bear an increase in demands for ever-faster and ever more capable distributed storage systems.

Distributed storage systems are often organized into a computing cluster that can aggregate various types and configurations of physical storage facilities to create a logical storage pool where data may be efficiently distributed according to various metrics and/or objectives (e.g., resource usage balancing). As an example, a VM operating at a node in a modern distributed computing and storage system might attach (e.g., mount) a virtual disk ("vDisk") to store certain data. This data vDisk is presented to the VM as a logically contiguous set of data (e.g., one or more extents), however the underlying data may be physically distributed across multiple storage facilities in the storage pool. Virtual disk metadata (e.g., data that describes a respective data virtual disk) are often defined so as to map logical representations of the data vDisk contents to physical storage locations of respective content, which physical content might be distributed across many storage devices of the computing cluster.

Unfortunately, in such architectures, looking up metadata in order to access the contents of data vDisks can be inefficient, especially when resolving to physical storage locations that hold the contents of vDisks involves multiple accesses or hops in order to resolve to an actual physical address of a particular area of a logically contiguous set of data where the content of the data vDisk is stored. More specifically, even in cases where the desired contents of a data vDisk might be stored locally (e.g., at the same computing node as a corresponding compute load), some approaches distribute the metadata across multiple nodes of the computing cluster. Thus, accessing the metadata needed to resolve to an actual physical storage location to access the content, would introduce multiple hops and associated latencies that are incurred when traversing through the multiple nodes corresponding to the multiple hops.

In fact, some approaches distribute the metadata data across all or nearly all of the nodes of the cluster. In certain architectures (e.g., in certain high-availability systems and/or for compliance with certain data replication policies), metadata is distributed across multiple availability domains that may include multiple storage devices and/or multiple computing nodes. When metadata is distributed across the multiple nodes of a computing node, a request to access data that is physically stored on a particular node might be first routed to a different node to retrieve the metadata that maps the virtual disk access request to the corresponding physical storage location. In some situations (e.g., sequential access of the contents of a virtual disk from beginning to end) the incurred hops can severely impact overall data access performance.

Maintaining larger and larger sets of metadata that might be distributed over larger and larger sets of nodes consumes commensurately more computing resources, more storage resources, more storage input and output loading, and more networking traffic, as well as consuming other system resources (e.g., memory), any and all of which effects can negatively impact overall virtual disk access latency. What is needed is a technological solution for low latency access to metadata when servicing an access to virtual disk data.

SUMMARY

The present disclosure provides a detailed description of techniques used in systems, methods, and in computer program products for low latency access to virtual disk metadata, which techniques advance the relevant technologies to address technological issues with legacy approaches. More specifically, the present disclosure provides a detailed description of techniques used in systems, methods, and in computer program products for multi-tiered metadata mapping in distributed computing environments. Certain embodiments are directed to technological solutions for implementing a multi-tiered metadata mapping regime comprising a metadata virtual disk that refers to a collocated data virtual disk.

The disclosed embodiments modify and improve over legacy approaches. In particular, the herein-disclosed techniques provide technical solutions that address the technical problems attendant to efficient access to virtual disk data in a distributed computing environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to massively parallel computing systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
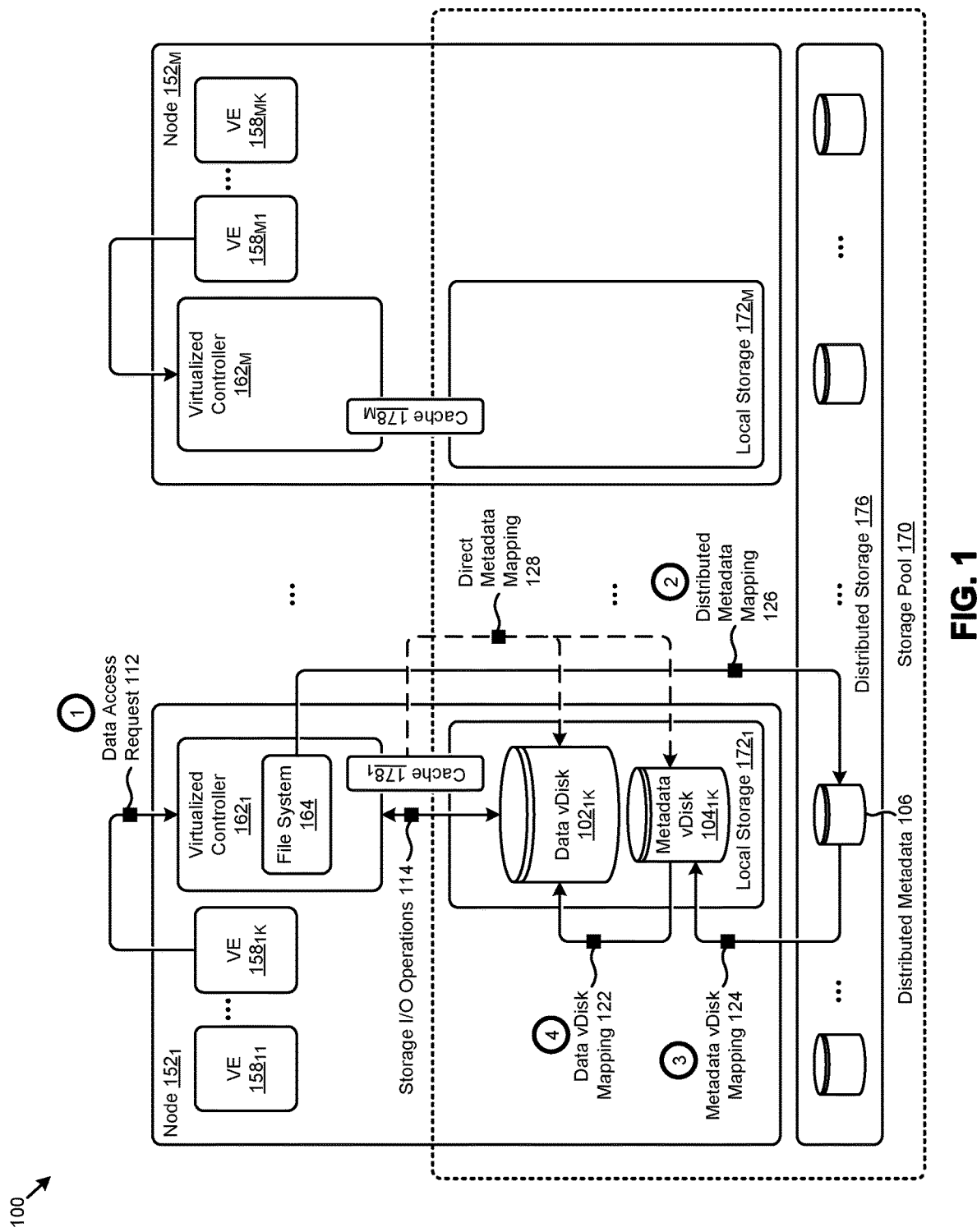
FIG. 1 illustrates a distributed computing environment in which embodiments of the present disclosure can be implemented.

Embodiments in accordance with the present disclosure address the problem of providing efficient access to virtual disk data in a distributed computing environment. Some embodiments are directed to approaches for implementing a high-performance multi-tiered metadata mapping regime comprising high-speed mapping, from an access request to the location of a metadata virtual disk that in turn refers to a collocated data virtual disk. The accompanying figures and discussions herein present example environments, systems, methods, and computer program products for multi-tiered metadata mapping in distributed computing environments.

Overview

Disclosed herein are techniques for implementing a multi-tiered metadata mapping regime that accesses a metadata virtual disk that is collocated with a corresponding data virtual disk. In certain embodiments, a data virtual disk comprising node-local stored data is generated at a computing node. A metadata virtual disk is also generated to store metadata that is collocated with the node-local stored data of the data virtual disk at the same computing node. The metadata virtual disk maps a logical representation of the data virtual disk contents to the physical storage locations of the underlying contents of the data virtual disk. Further, in a higher tier, a distributed metadata database operates to cover the extents of data stored in a distributed storage pool. The distributed metadata database is accessible by any computing node. Such a distributed metadata database is updated when vDisks are created. The updates include at least a reference to a metadata virtual disk that is generated at the same time as the creation of the data vDisk. This multi-tiered metadata mapping regime formed by the distributed metadata database (e.g., in a higher tier) and the metadata virtual disk (e.g., in a lower tier) is efficiently stored and traversed in accordance with the herein-disclosed embodiments so as to facilitate efficient access to the locally stored contents of any data virtual disk.

In certain embodiments, when requests to retrieve or otherwise operate over a portion of the contents of the virtual disk are received, a database entry of the distributed metadata database is accessed to identify the location of the metadata virtual disk, which in turn is accessed to identify the physical location of the portion of the data virtual disk to be operated over. In certain embodiments, a file system layout is included in the multi-tiered metadata mapping regime (e.g., in a tier higher than the distributed metadata database tier) to facilitate mapping of the requests to physical storage locations. In certain embodiments, any or all of the distributed metadata database or the metadata virtual disk can be stored in one or more in-memory data structures (e.g., single- or multi-level caches, etc.).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a distributed computing environment 100 in which embodiments of the present disclosure can be implemented. The embodiment shown in FIG. 1 is merely one example. As shown, the distributed computing environment (e.g., virtualized computing environment) comprises multiple computing nodes (e.g., node $152_1$, . . . , node $152_M$) that can implement any number and/or type (e.g., VM, container, etc.) of virtualized entities (e.g., VE $158_{11}$, . . . , VE $158_{1K}$, . . . , VE $158_{M1}$, . . . , VE $158_{MK}$). Virtualized controllers (e.g., virtualized controller $162_1$, virtualized controller $162_M$) at the nodes facilitate access to certain storage facilities in a storage pool 170. Specifically, the controllers can facilitate access to certain local storage facilities (e.g., local storage $172_1$, . . . , local storage $172_M$), and/or to a set of distributed storage facilities (e.g., distributed storage 176). In some architectures, a cache memory (e.g., cache $178_1$, . . . , cache $178_M$) at each node can be allocated to the in-memory storage of the virtualized controllers and/or to the low latency access storage areas (e.g., hard disk drives or HDDs and/or solid state drives or SSDs) of the local storage.

Further details regarding general approaches to implementing caches using low latency access storage areas are described in U.S. application Ser. No. 15/057,317 titled "SPILLING SMALL CACHE ENTRIES TO A SOLID STATE DEVICE", filed on Mar. 1, 2016, which is hereby incorporated by reference in its entirety.

As earlier described, certain objectives (e.g., performance objectives) might influence or constrain the physical storage location of certain data accessed by the VEs. For example, the underlying data of a data vDisk $102_{1K}$ that is frequently accessed by VE $158_{1K}$ might be physically stored on node $152_1$ to facilitate achievement of low latency access objectives. In certain architectures, while the desired data might be collocated with the requesting VE (e.g., on node $152_1$), the metadata used to access the data might be distributed across the storage pool 170 (e.g., at node $152_M$, in distributed storage 176, etc.), which can negatively impact data access performance.

The herein disclosed techniques address problems attendant to efficient access to virtual disk metadata and data by implementing a multi-tiered metadata mapping regime that accesses a metadata virtual disk that is collocated with a corresponding data virtual disk.

As used herein a virtual disk is a representation (e.g., a data structure) of a logically contiguous set of data where contents of the data of the virtual disk are stored. A data virtual disk is a virtual disk that holds content that is operated over by a computing task such as a user virtual machine or such as an executable container or such as any other type of executable virtual entity. As used herein a data virtual disk serves as a lower or lowest level of the disclosed multi-tiered metadata mapping regime. A metadata virtual disk is a virtual disk that holds information pertaining to the location and status of the contents of a data virtual disk. As used herein a metadata virtual disk serves as a middle or higher level of the disclosed multi-tiered metadata mapping regime. A metadata virtual disk can form a logical representation of any number of data storage areas that are underpinned by corresponding physical storage locations of a physical storage device.

One implementation of a multi-tiered metadata mapping regime is illustrated in distributed computing environment 100. Specifically, a metadata vDisk $104_{1K}$ is collocated at node $152_1$ with the stored data of data vDisk $102_{1K}$. The set of metadata comprising the metadata vDisk $104_{1K}$ facilitate a data vDisk mapping 122 of the logical storage areas (e.g., extents, extent groups, etc.) of data vDisk $102_{1K}$ to the physical storage areas (e.g., blocks of a physical storage device) that store the underlying data. Further, in a higher tier of the multi-tiered metadata mapping regime, a set of distributed metadata 106 in storage pool 170, accessible by node $152_1$ and other computing nodes (e.g., node $152_M$), is updated to include a pointer (e.g., metadata vDisk mapping 124) to the location of the metadata vDisk $104_{1K}$. In certain embodiments, a file system layout (e.g., in file system 164 at node $152_1$) is designed to include a distributed metadata mapping 126 to facilitate an efficient lookup of the portion of the distributed metadata 106 associated with a particular data vDisk.

The multi-tiered metadata mapping regime formed by the distributed metadata mapping 126, the metadata vDisk mapping 124, and the data vDisk mapping 122 is efficiently stored and traversed so as to facilitate efficient access to the locally stored data of data vDisk $102_{1K}$. As an example, (at operation 1) when a data access request 112 for a particular data vDisk (e.g., data vDisk $102_{1K}$) is received, the distributed metadata mapping 126 (operation 2) at file system 164 is consulted to efficiently discover the portion of distributed metadata 106 associated with the request. The metadata vDisk mapping 124 (operation 3) of the distributed metadata 106 is accessed to locate the metadata vDisk $104_{1K}$. The data vDisk mapping 122 (operation 4) comprising metadata vDisk $104_{1K}$ is then accessed to identify the physical location of the portion of the data vDisk $102_{1K}$ to be operated over (e.g., by storage I/O (input/output or IO) operations 114) in accordance with the data access request 112. In certain embodiments, any or all of the distributed metadata 106 or the metadata vDisk $104_{1K}$ can be stored in cache memory (e.g., cache $178_1$) to facilitate a direct metadata mapping 128 to the distributed metadata 106 or the metadata vDisk $104_{1K}$, respectively.

Figure 2:
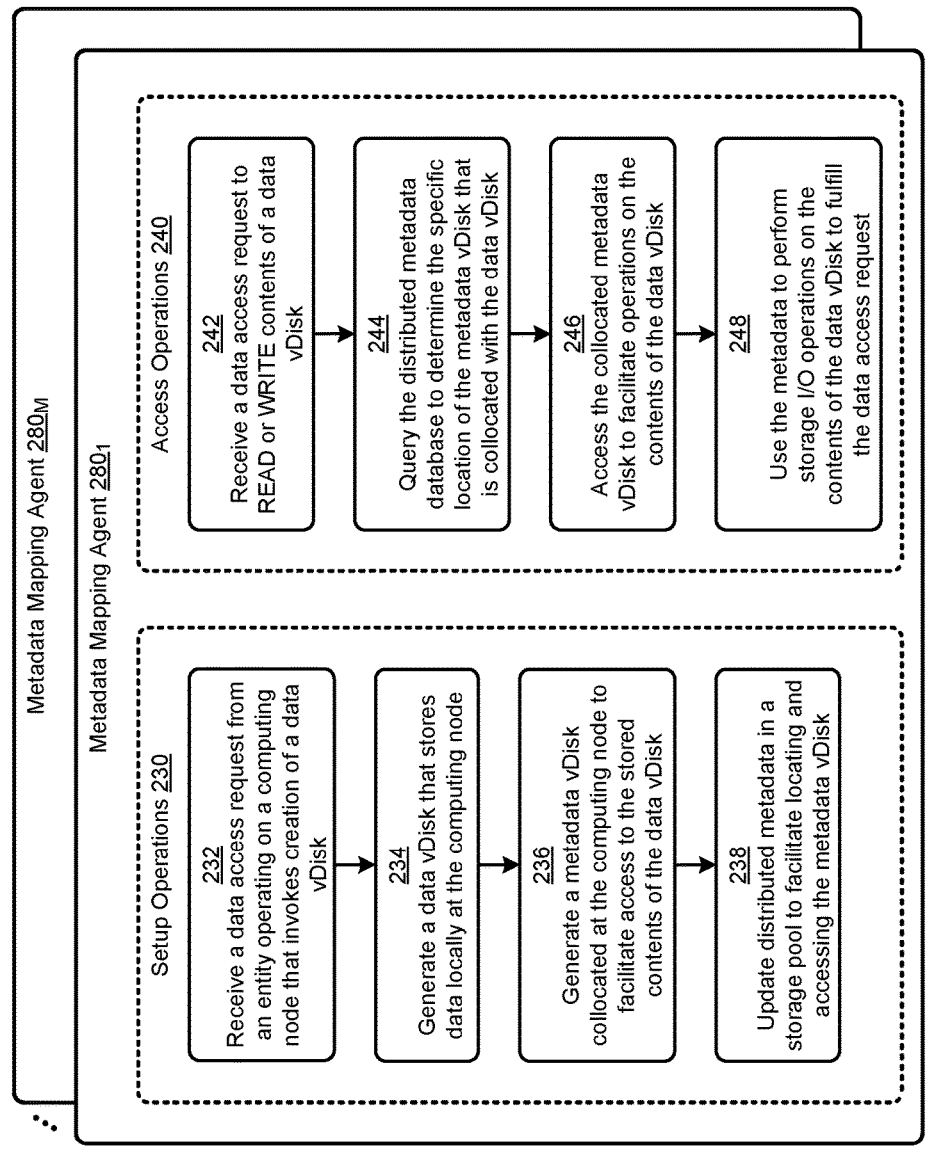
FIG. 2 depicts a low latency data access technique as implemented in systems that facilitate multi-tiered metadata mapping in distributed computing environments, according to an embodiment.

Further details pertaining to the setup and use of the aforementioned multi-tiered metadata mapping regime according to the herein disclosed techniques is shown and described as pertains to FIG. 2.

FIG. 2 depicts a low latency data access technique 200 as implemented in systems that facilitate multi-tiered metadata mapping in distributed computing environments. As an option, one or more variations of low latency data access technique 200 or any aspect thereof may be implemented in the context of the architecture and functionality of the embodiments described herein. The low latency data access technique 200 or any aspect thereof may be implemented in any environment.

The low latency data access technique 200 presents one embodiment of certain steps and/or operations that facilitate low latency data access in distributed computing environments using multi-tiered metadata mapping. As shown, the steps and/or operations can be grouped in a set of setup operations 230 (e.g., metadata virtual disk and distributed metadata setup operations) and a set of access operations 240 (e.g., metadata and data access operations). In certain embodiments, these operations can be performed by instances of a metadata mapping agent (e.g., metadata mapping agent $280_1$, . . . , metadata mapping agent $280_M$).

For example, instances of the metadata mapping agent might operate at each node in a cluster or at a selected node (e.g., leader node) in the cluster. As illustrated, the setup operations 230 of the low latency data access technique 200 can commence by receiving a data access request from an entity (e.g., VE, VM, container, etc.) operating on a computing node that invokes creation of a data vDisk (step 232). For example, the data access request might be a request to create a data vDisk and attach it (e.g., mount it) to a particular VM. The data vDisk is generated so as to store the set of data associated with the data vDisk at the computing node of the entity (step 234).

In some cases, certain attributes (e.g., an allocation size) of the data vDisk are specified as parameters (e.g., "create_size=500G") in the data access request. In other cases (e.g., cloning of another vDisk), the attributes of the data vDisk might be derived from a virtual disk specification stored in the distributed computing environment. Some attributes, such as a unique file system identifier for the data vDisk, are created as a result of the generation process. Generation of the data vDisk might further define certain logical storage areas (e.g., blocks, slices, extents, extent groups, etc.) comprising the data vDisk. The quantity of the logical storage areas and/or other attributes (e.g., size) of the logical storage areas can be derived, for example, from the allocation size. A metadata vDisk collocated at the computing node is also generated to facilitate access to the data of the data vDisk (step 236). Specifically, the metadata vDisk comprises metadata that facilitates mapping from the logical storage areas of the data vDisk to a set of physical storage areas (e.g., on physical storage devices such as HDDs or SSDs) that store the underlying data. A set of distributed metadata in a storage pool of the distributed computing environment is updated to facilitate access to the metadata vDisk (step 238). As an example, the distributed metadata might describe a location and a unique identifier of the metadata vDisk.

Further details regarding general approaches to managing distributed metadata are described in U.S. application Ser. No. 15/965,656 titled "EFFICIENT METADATA MANAGEMENT", filed on Apr. 27, 2018 which is hereby incorporated by reference in its entirety.

The access operations 240 shown in FIG. 2 can commence by receiving a data access request (e.g., data write, data read, etc.) to access a data vDisk having data that is locally (e.g., with respect to the requesting entity) stored (step 242). According to the herein disclosed techniques, a set of distributed metadata is accessed to determine a location of a metadata vDisk that is collocated with the data vDisk (step 244). The metadata of the metadata vDisk is accessed to facilitate operations on the data of the data vDisk (step 246). Specifically, one or more storage I/O operations can be performed on the data of the data vDisk to fulfill the data access request (step 248).

Figure 3A:
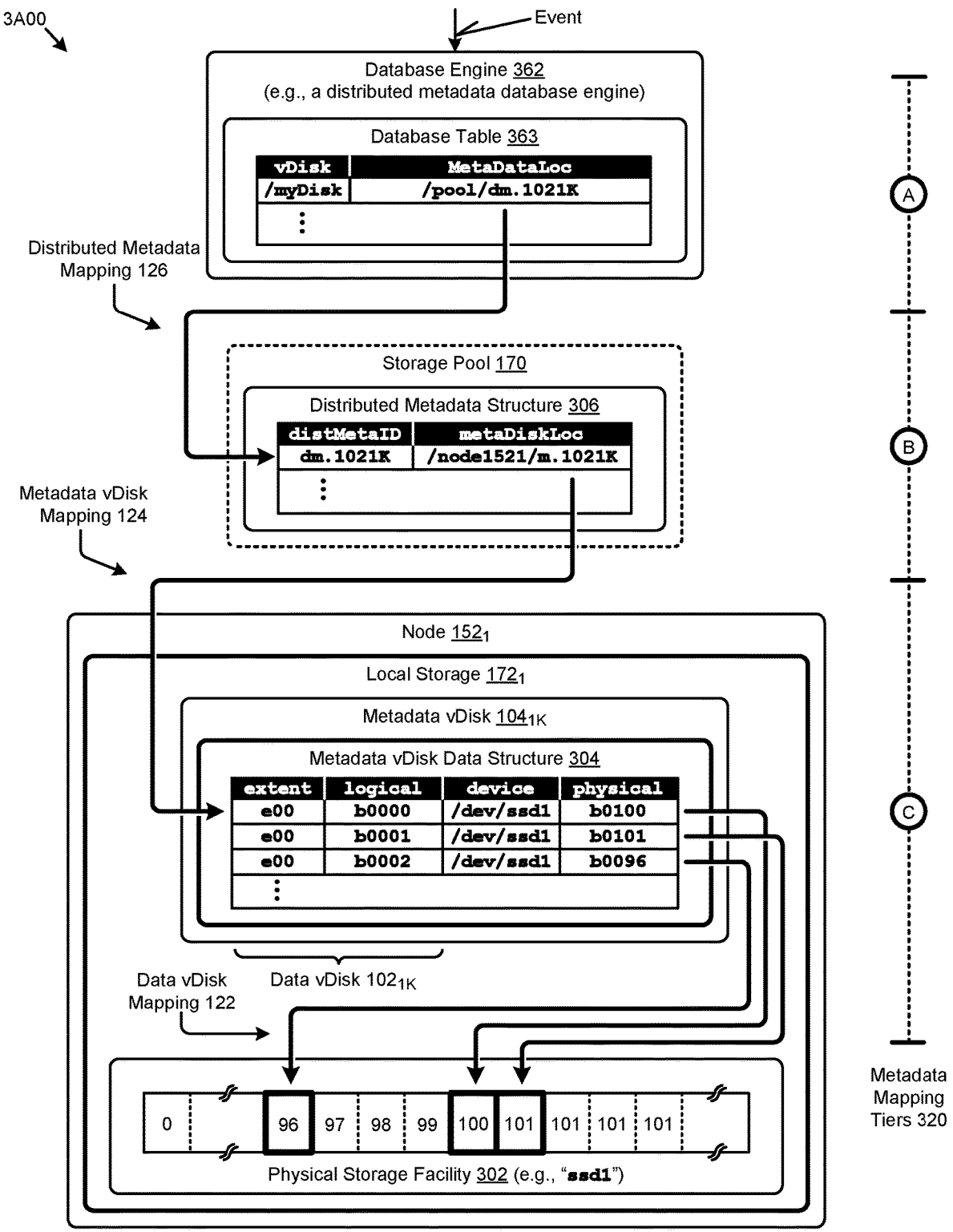
FIG. 3A and FIG. 3B are diagrammatic representations of data structures used to implement multi-tiered metadata mapping in distributed computing environments, according to an embodiment.
Figure 3B:
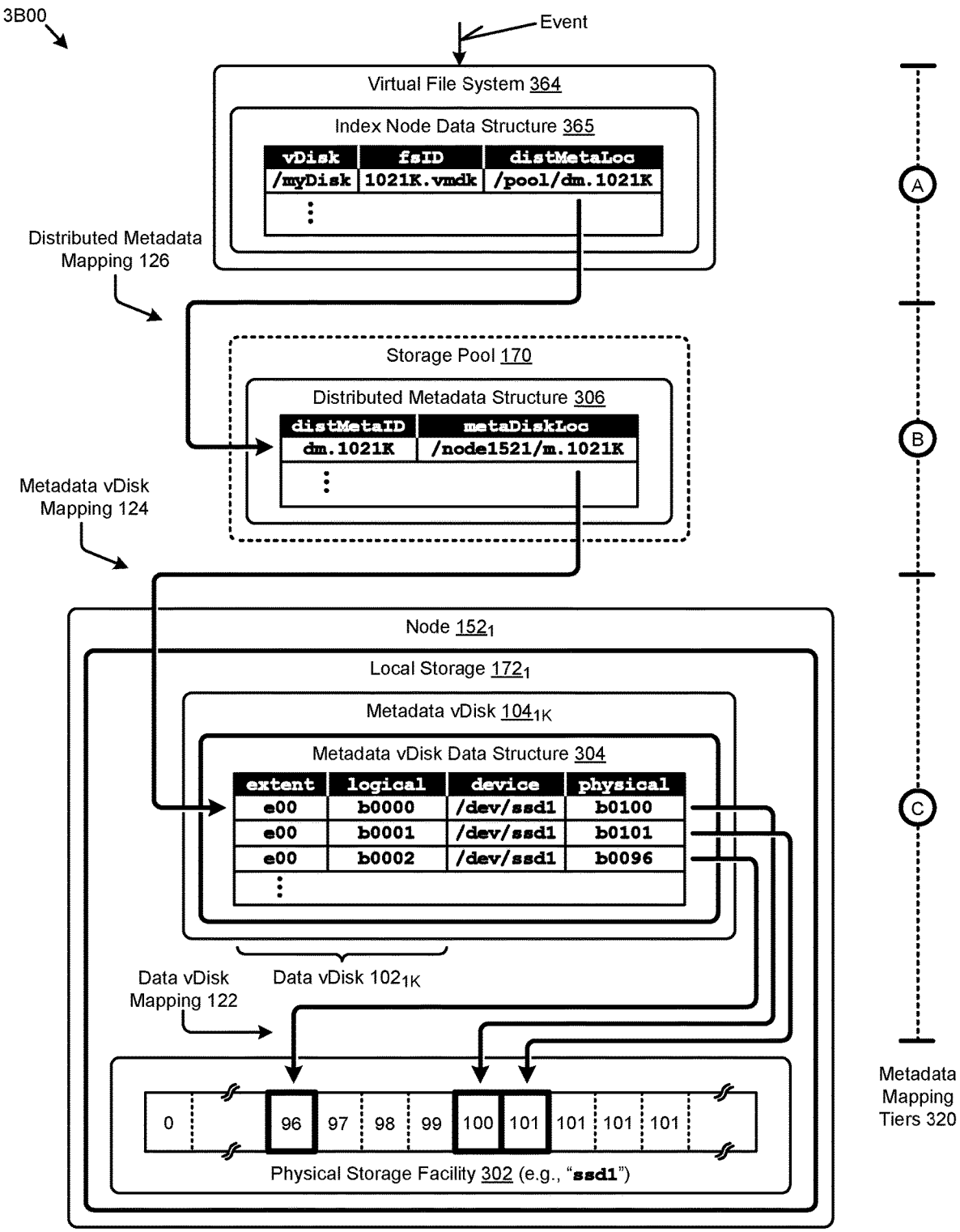

A detailed embodiment of the data structures that codify the various instances of mapping described herein is presented and discussed as pertains to FIG. 3A and FIG. 3B.

FIG. 3A is a diagrammatic representation 3A00 of data structures used to implement multi-tiered metadata mapping in distributed computing environments. As an option, one or more variations of data structures or any aspect thereof may be implemented in the context of the architecture and functionality of the embodiments described herein. The data structures or any aspect thereof may be implemented in any environment.

The data structures present certain specialized data structures that are designed to improve the way a computer stores and retrieves data in memory when performing the herein disclosed techniques. A set of representative relationships (e.g., mapping relationships) between the data structures are also shown. As can be observed, certain data structures (e.g., database table 363, distributed metadata structure 306, and metadata vDisk data structure 304) can form a set of metadata mapping tiers 320 (e.g., tier A, tier B, and tier C, respectively) in a multi-tiered metadata mapping regime.

Multi-tiered metadata mapping is observed when processing an access request (e.g., at tier A). Specifically, and as shown, upon receipt of a data access request, the database engine 362 (e.g., a distributed metadata database engine) is queried so as to retrieve the location of the metadata that corresponds to the metadata virtual disk that in turn corresponds to the data virtual disk referenced in the access request. The results of an example query is shown in FIG. 3A as distributed metadata mapping 126 that points to the retrieved location. Specifically, and as shown, the retrieved location identifies the location of distributed metadata structure. In turn, the distributed metadata structure 306 shown in FIG. 3A corresponds to a metadata mapping tier (e.g., tier B) that facilitates a metadata location mapping (e.g., metadata vDisk mapping 124) from the distributed metadata identifier to a metadata vDisk location identifier. In some embodiments, distributed metadata structure 306 might be included in one or more instances (e.g., duplications, shards, partitions, etc.) of metadata distributed across a storage pool 170. As represented in FIG. 3A, distributed metadata structure 306 might describe a relationship between a distributed metadata identifier (e.g., "dm.1021K" stored in a "distMetaID" field) and a metadata vDisk location identifier (e.g., "/node1521/m.1021K" stored in a "MetaDiskLoc" field). In many cases, the metadata location mapping can be achieved in the distributed metadata structure with a low amount of data so as to facilitate low latency access to the target metadata vDisk. The shown tabular representation of the foregoing data is merely one example of a structure for organizing and/or storing the data comprising distributed metadata structure 306, and other structures are possible.

As shown, the metadata vDisk data structure 304 might correspond to a metadata mapping tier (e.g., tier C) that facilitates a data mapping (e.g., data vDisk mapping 122) from, for example, a set of logical storage areas of data vDisk $102_{1K}$ to a set of physical storage areas in physical storage facility 302 (e.g., an SSD identified as "ssd1"). In some embodiments, metadata vDisk data structure 304 might organize and/or store the metadata comprising a particular metadata vDisk (e.g., metadata vDisk $104_{1K}$) that corresponds to a particular data vDisk (e.g., data vDisk $102_{1K}$).

According to the herein disclosed techniques, the data associated with the data vDisk and the metadata of the metadata vDisk are collocated to facilitate low latency access to the metadata and/or the data. For example, as can be observed, the underlying data in physical storage facility 302 associated with data vDisk $102_{1K}$ and the metadata comprising the metadata vDisk $104_{1K}$ are collocated in local storage $172_1$ of node $152_1$. As represented in FIG. 3A, metadata vDisk data structure 304 might describe a relationship between the logical storage areas of a data vDisk and the physical storage areas where the data is stored. Specifically, the logical storage areas might be represented by an extent identifier (e.g., "ext00" stored in an "extent" field) and a logical block identifier (e.g., "b0000" stored in a "logical" field). Further, the physical storage areas mapped to the logical storage areas might be represented by a physical storage location identifier in the form of a physical storage device identifier (e.g., "/dev/ssd1" stored in a "device" field) and/or a physical block identifier (e.g., "b0100" stored in a "physical" field). The shown tabular representation of the foregoing data is merely one example of a structure for organizing and/or storing the data comprising metadata vDisk data structure 304, and other structures are possible.

FIG. 3B is a diagrammatic representation 3B00 of data structures used to implement multi-tiered metadata mapping in distributed computing environments. As an option, one or more variations of data structures or any aspect thereof may be implemented in the context of the architecture and functionality of the embodiments described herein. The data structures or any aspect thereof may be implemented in any environment.

The data structures present certain specialized data structures that are designed to improve the way a computer stores and retrieves data in memory when performing the herein disclosed techniques. A set of representative relationships (e.g., mapping relationships) between the data structures are also shown. As can be observed, certain data structures (e.g., index node data structure 365, distributed metadata structure 306, and metadata vDisk data structure 304) can form a set of metadata mapping tiers 320 (e.g., tier A, tier B, and tier C, respectively) in a multi-tiered metadata mapping regime.

Such a multi-tiered metadata mapping regime is observed when processing an access request (e.g., at tier A). Specifically, and as shown, upon receipt of a data access request, a virtual file system 364 is consulted so as to retrieve the location of the metadata that corresponds to the metadata virtual disk that in turn corresponds to the data virtual disk referenced in the access request (e.g., as depicted by the shown distributed metadata mapping 126). The retrieved location identifies the location of distributed metadata structure 306.

In this specific embodiment, the index node data structure 365 corresponds to a metadata mapping tier (e.g., tier A) that facilitates a file system mapping (e.g., distributed metadata mapping 126) from, for example, a data vDisk identifier into a distributed metadata location identifier. In some embodiments, index node data structure 365 is a data structure that codifies the layout of the virtual file system. Such an index node data structure might be stored as file or other storage unit of a physical storage facility. In other embodiments, portions (e.g., individual entries) of the index node data structure 365 might be formed of a plurality of distributed subsets of the inode data.

As represented in FIG. 3B, index node data structure 365 describes a relationship between a virtual disk logical name (e.g., "/myDisk" stored in a "vDisk" field), a virtual file system identifier (e.g., "1021K.vmdk" stored in an "fsID" field), and a distributed metadata location identifier (e.g., "/pool/dm.1021K" stored in a "distMetaLoc" field). The shown tabular representation of the foregoing data is merely one example of a structure for organizing and/or storing the data comprising index node data structure 365. Other file system layouts and/or other representations of inodes of a virtual file system are possible.

In use, when the distributed metadata location identifier has been determined, the corresponding location is accessed, which in turn points to the location of the data vDisk that was referred to in the access request. When the data vDisk and its corresponding metadata vDisk are collocated, and when local caches are implemented, extremely low-latency access is achieved—even in cases where the storage pool 170 is very large.

Figure 4A:
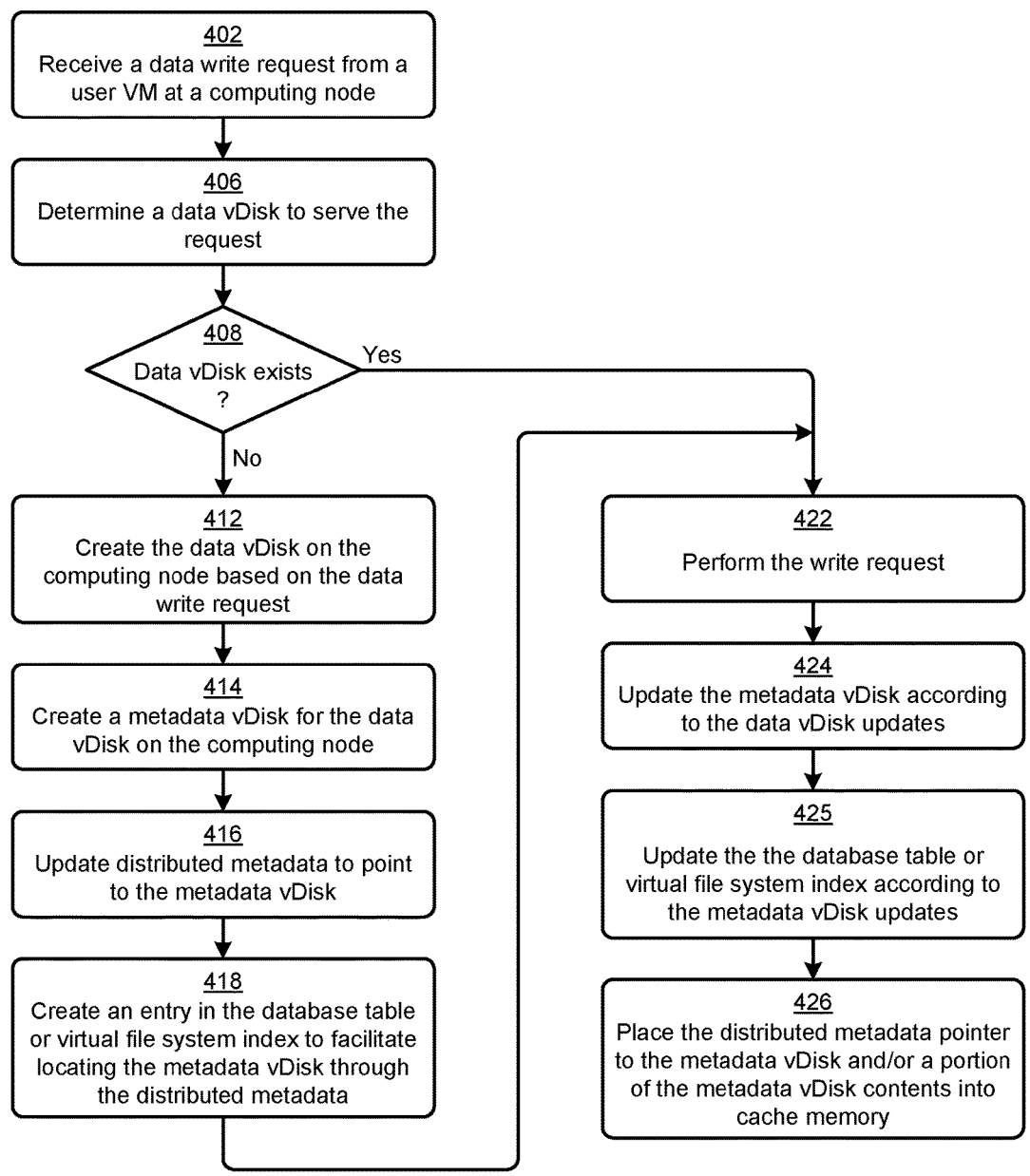
FIG. 4A depicts a data virtual disk write technique as implemented in systems that facilitate multi-tiered metadata mapping in distributed computing environments, according to an embodiment.

One embodiment of a technique for performing a write to a data vDisk in environments that implement all or portions of the herein-disclosed multi-tiered metadata mapping regime according is presented and discussed as pertains to FIG. 4A.

FIG. 4A depicts a data virtual disk write technique 4A00 as implemented in systems that facilitate multi-tiered metadata mapping in distributed computing environments. As an option, one or more variations of data virtual disk write technique 4A00 or any aspect thereof may be implemented in the context of the architecture and functionality of the embodiments described herein. The data virtual disk write technique 4A00 or any aspect thereof may be implemented in any environment.

The data virtual disk write technique 4A00 presents one embodiment of certain steps and/or operations pertaining to writing to a data virtual disk in a system implementing multi-tiered metadata mapping. As can be observed, data virtual disk write technique 4A00 can commence by receiving a data write request from a VM at a computing node (step 402). The data pertaining to the request is written to a persistent write buffer. A virtualized controller at the computing node might manage a write buffer (e.g., implementing a write commit log, an operation log, a time of last write indication, a free block indication, or other status indicators, etc.) to improve the performance of certain storage I/O operations (e.g., random writes) at the node. A data vDisk to serve the data write request is determined (step 406). The data vDisk might be determined, for example, by consulting a file system layout and/or a data I/O manager to determine which particular vDisk from among many data vDisks is the vDisk referenced by the data write request.

If the identified data vDisk does not exist (see "No" path of decision 408), the data vDisk and various tiers of metadata will be created, according to the herein disclosed techniques. Specifically, a data vDisk will be created on the computing node based in part on the data write request (step 412). For example, the size allocation of the data vDisk might be derived from the data write request. As another example, the size allocation and/or other attributes pertaining to the data vDisk might be derived from a predetermined virtual disk specification that is selected based in part on certain parameters (e.g., data size, data type, etc.) characterizing the data write request. A metadata vDisk comprising metadata associated with the data vDisk is also created at the same computing node (e.g., collocated with the data vDisk) (step 414). A set of distributed metadata is updated to include a pointer to the location of the metadata vDisk (step 416). Further, in certain embodiments, an entry in the virtual file system (e.g., an inode in the file system index) is created to facilitate locating the metadata vDisk through the distributed metadata (step 418). As used herein, a virtual file system is a collection metadata that describes a mapping between logical storage areas (e.g., files, virtual files, virtual disks, etc.) and at least one physical storage area (e.g., a storage device, a block or sector, an access location address, etc.).

When the data vDisk and associated metadata are created responsive to receiving the data write request or earlier created (see "Yes" path of decision 408), the storage I/O operation pertaining to the data write request is performed (step 422). Any updates to the metadata vDisk responsive to the data vDisk updates can be executed (step 424), possibly including updating the metadata indications such as "time of last write", etc. At step 425, the database table or the virtual file system is updated to reflect the effect of the storage I/O operation and/or the effect of updating the metadata indications that were performed in step 424. In certain cases and/or embodiments, the pointer to the metadata vDisk from the distributed metadata, and/or the metadata indications, and/or any or all of the metadata from the metadata vDisk can be placed into cache memory (step 426).

In some situations, the stored data (e.g., underpinned by corresponding physical storage), and/or its corresponding first level of metadata are very large. In such cases the first level of metadata might be considered as "data", and another next level of metadata is generated to refer to the first level of metadata. Any number of iterations can be performed such that any further next level of metadata refers to the previous level of metadata, and so on. The iterations can continue until a stop condition is encountered (e.g., when the last generated set of metadata is sufficiently small so as to fit into a particular memory allocation, or when some threshold is reached). Certain iterative metadata generation techniques to be used in such situations are shown and discussed as pertains to FIG. 4B.

Figure 4B:
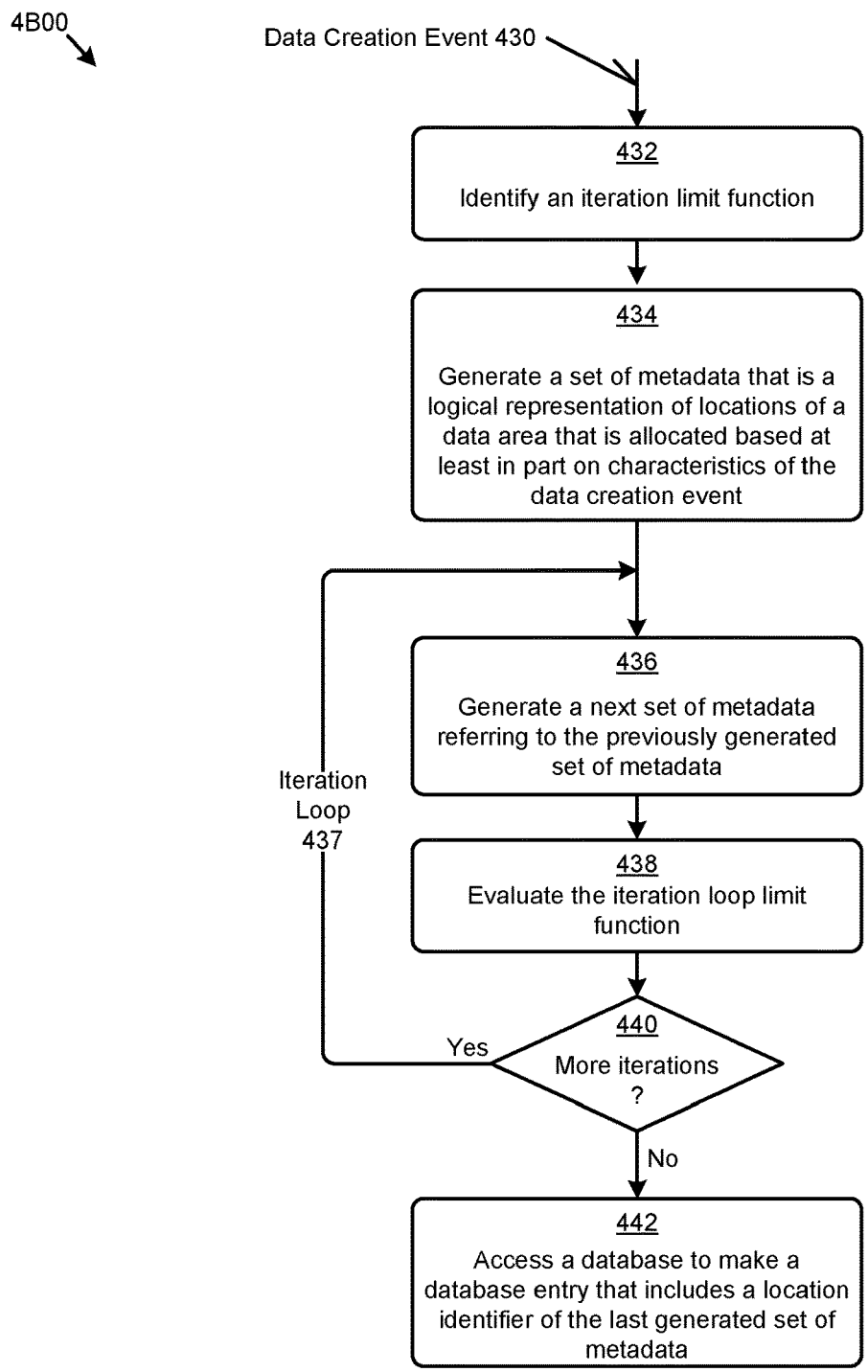
FIG. 4B depicts an iterative metadata generation technique as implemented in systems that facilitate multi-tiered metadata mapping in distributed computing environments, according to an embodiment.

FIG. 4B depicts an iterative metadata generation technique as implemented in systems that facilitate multi-tiered metadata mapping in distributed computing environments. Using the hereunder discussed iterative metadata generation technique, computing systems can be configured to efficiently manage access to logical representations of allocated areas and/or stored data of a storage device. As shown, the iterative metadata generation technique 4B00 commences upon occurrence of a data creation event 430. The characteristics of the data creation event might include or imply a request to allocate physical storage space to store data on a storage device of the computing system. In the practice of the iterative metadata generation technique, an iteration limiting function is identified (step 432), which iteration limiting function serves to control (e.g., based at least in part on one or more input parameters and/or one or more conditions) the number of repeated calls, and thus to control the number of iterations that are performed to generate a next level of metadata. The calling syntax for invoking such an iteration limiting function might be codified as shown in EQ. 1:

$$\text{<Boolean Value>}=\text{iterationLimitFunction}(S,N,R) \quad \text{(EQ. 1)}$$

where:
S=a desired maximum size for the generated metadata after a last iteration,
N=a value for the maximum number of iterations threshold, and
R=the current number of iterations as of the calling of the function.

As shown in this embodiment, before calling an iteration limiting function, step 434 serves to generate a set of metadata that is a logical representation of locations of the data that corresponds to the data creation event. The physical locations of the data can derive from, or be based at least in part on characteristics of the physical storage and or a file system layout.

At step 436, an iteration loop 437 is entered. The operations within the loop include (1) evaluating an iteration limiting function to determine whether or not to generate a next set of metadata, (2) generating next set of metadata (or not generating next set of metadata), the generation determination based at least in part on a returned value of the iteration limiting function. Next, the iteration loop is performed iteratively, such that each time through the loop, the loop operations include (3) once again evaluating the iteration limiting function (at step 438) to calculate a next returned value, and if (at decision 440) the next returned value of the iteration limiting function indicates a next level of metadata is to be generated, then (4) generating an additional set of metadata. When decision 440 determines there are no further iterations to be performed (e.g., if the maximum number of iterations threshold has been reached), then the "No" branch of decision 440 is taken and the location of the last generated metadata is entered into a database (at step 442). In each pass through the iteration loop, the next generated metadata points to at least some location of the previously generated metadata, and so on.

The data creation event 430 can refer to any storage area and/or a specified usage of the storage area. Strictly as examples, the data to be held in the storage area on the storage device of the computing system might comprise storage area(s) for a file system, or might comprise storage areas for database content storage that is accessed by a database engine. Using such iteration, successive sets of metadata can be generated until limited by a condition. As one example of such a condition, the iteration limiting function might comprise an input parameter that characterizes a target size of the next set of metadata.

Some embodiments collocate the successive sets of metadata at the same computing node and/or on the same or collocated storage devices. In some computing system architectures, the aforementioned co-location supports efficient, low latency traversal through multiple levels of metadata so as to resolve to a physical storage area address of a physical storage area. One embodiment of a technique for low latency access to and through multiple levels of metadata is shown and described as pertains to FIG. 5.

Figure 5:
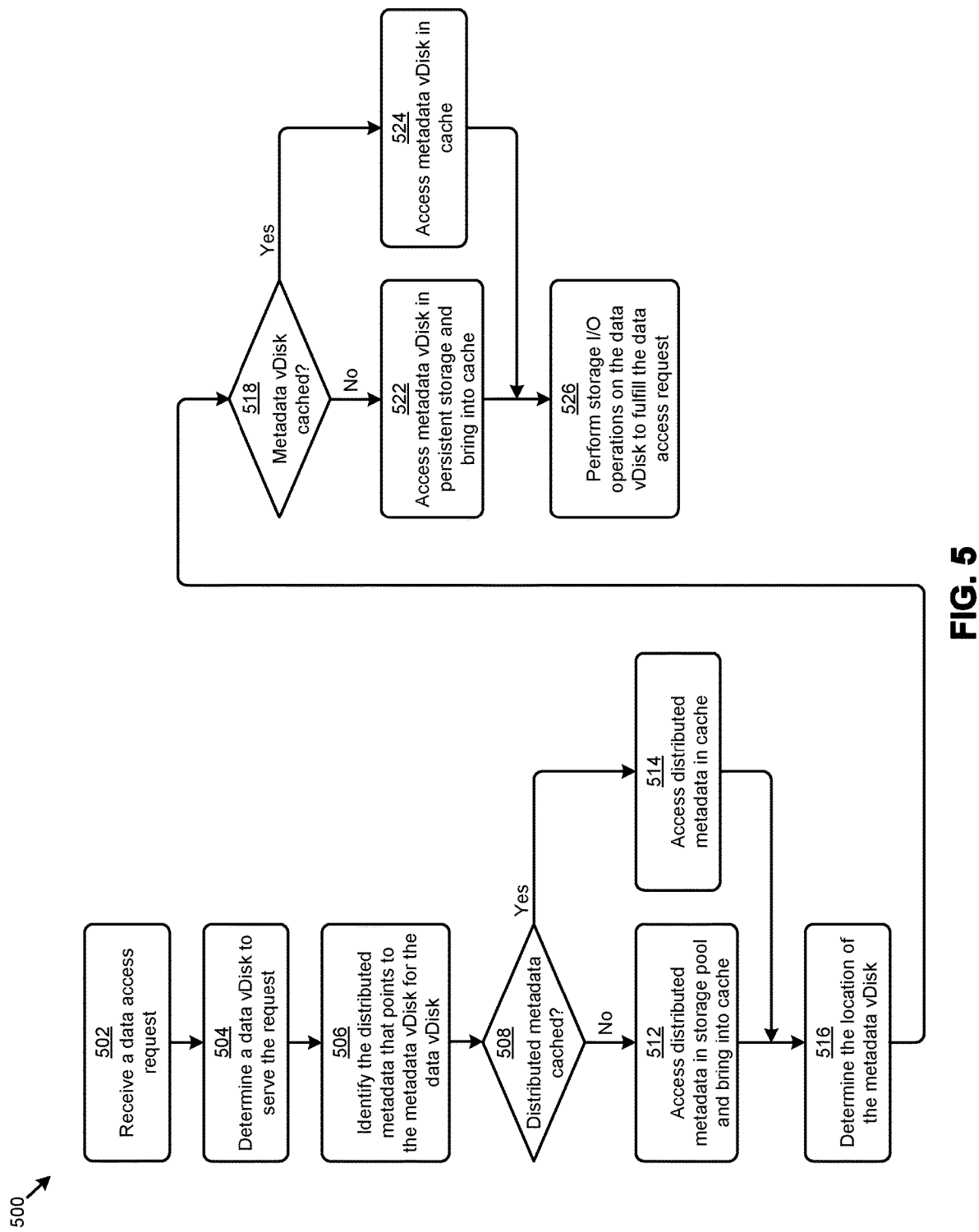
FIG. 5 presents a metadata virtual disk access technique as implemented in systems that facilitate multi-tiered metadata mapping in distributed computing environments, according to an embodiment.

FIG. 5 presents a metadata virtual disk access technique 500 as implemented in systems that facilitate multi-tiered metadata mapping in distributed computing environments. As an option, one or more variations of metadata virtual disk access technique 500 or any aspect thereof may be implemented in the context of the architecture and functionality of the embodiments described herein. The metadata virtual disk access technique 500 or any aspect thereof may be implemented in any environment.

The metadata virtual disk access technique 500 presents one embodiment of certain steps and/or operations for low latency access to virtual disk metadata facilitated by multi-tiered metadata mapping in a distributed computing environment. As can be observed, metadata virtual disk access technique 500 can commence by receiving a data access request (step 502). The data access request is analyzed to determine a data vDisk to serve the request (step 504). The distributed metadata that points to the location of the metadata vDisk for the data vDisk is identified (step 506). For example, a file mapping codified in the file system layout can facilitate identification of the distributed metadata using some identifier (e.g., file system identifier, file name, etc.) associated with the data vDisk.

If the identified distributed metadata is cached (see "Yes" path of decision 508) the distributed metadata stored in cache memory is accessed (step 514). If the identified distributed metadata is not cached (see "No" path of decision 508), the distributed metadata is accessed from the storage pool (step 512). The distributed metadata is processed to determine the location of the metadata vDisk pertaining to the data vDisk (step 516). In some cases, the metadata from the metadata vDisk might have been recently accessed so as to be in cache memory (see "Yes" path of decision 518). In such cases, requesting the metadata vDisk at the location provided by the distributed metadata will facilitate access to the metadata vDisk from the cache (step 524). If the metadata from the metadata vDisk is not cached (see "No" path of decision 518), requesting the metadata vDisk at the location provided by the distributed metadata will facilitate access to the metadata vDisk from persistent storage (step 522). Using the accessed metadata comprising the metadata vDisk, various storage I/O operations can be performed on the data vDisk to fulfill the data access request (step 526).

Figure 6A:
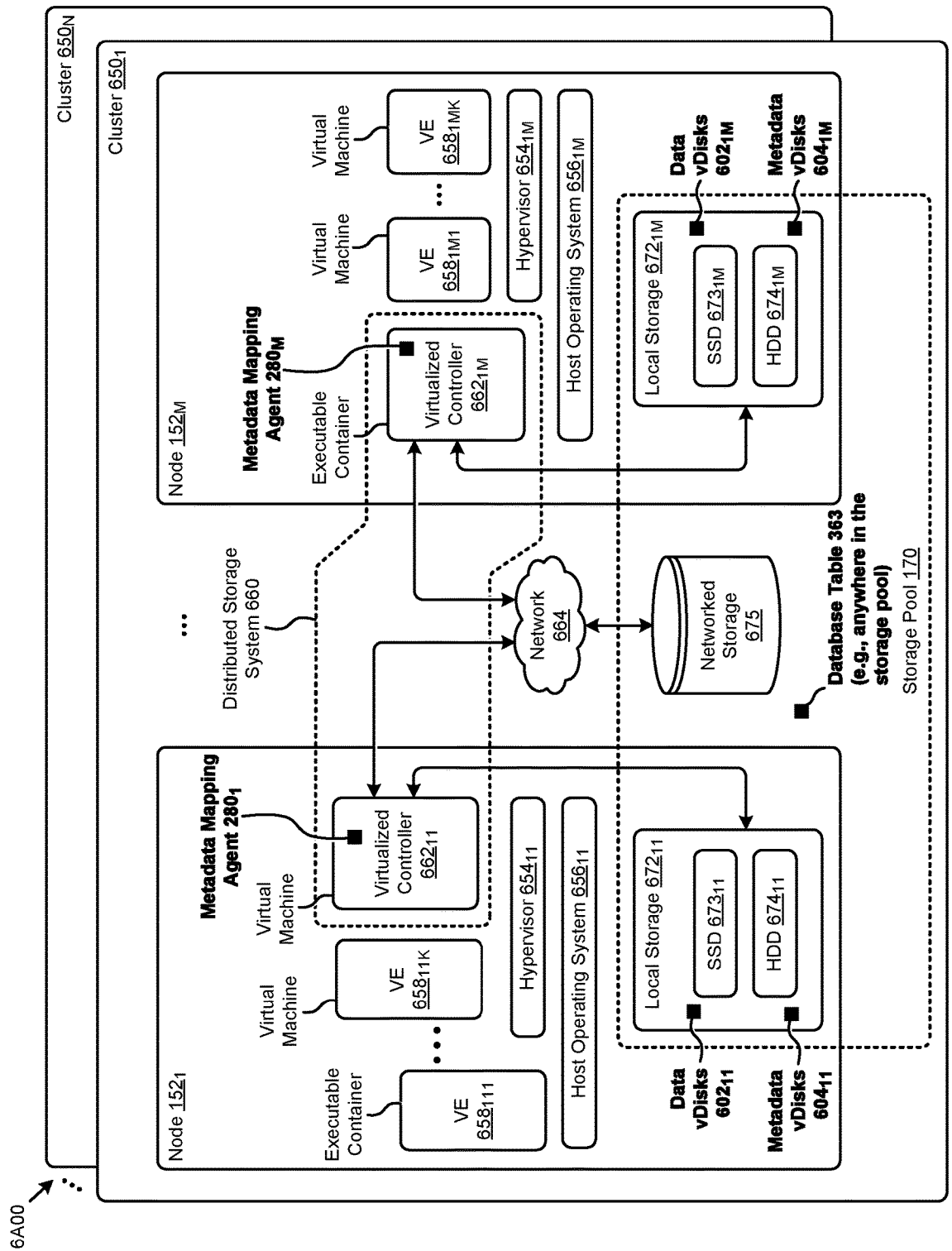
FIG. 6A presents a distributed virtualization environment in which embodiments of the present disclosure can operate.

An example of a distributed computing environment (e.g., distributed virtualization environment, etc.) that supports any of the herein disclosed techniques is presented and discussed as pertains to FIG. 6A.

FIG. 6A presents a distributed virtualization environment 6A00 in which embodiments of the present disclosure can operate. The embodiment shown in FIG. 6A is merely one example. The shown distributed virtualization environment depicts various components associated with one instance of a distributed virtualization system (e.g., hyperconverged distributed system) comprising a distributed storage system 660 that can be used to implement the herein disclosed techniques.

Specifically, the distributed virtualization environment 6A00 comprises multiple clusters (e.g., cluster $650_1$, . . . , cluster $650_N$) comprising multiple nodes that have multiple tiers of storage in a storage pool. Representative nodes (e.g., node $152_1$, . . . , node $152_M$) and storage pool 170 associated with cluster $650_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}$, . . . , local storage $672_{1M}$). For example, the local storage can be within or directly attached to a server and/or appliance associated with the nodes. Such local storage can include solid state drives (SSD $673_{11}$, . . . , SSD $673_{1M}$), hard disk drives (HDD $674_{11}$, . . . , HDD $674_{1M}$), and/or other storage devices.

As shown, the nodes in distributed virtualization environment 6A00 can implement one or more user virtualized entities (e.g., VE $658_{111}$, . . . , VE $658_{11K}$, . . . , VE $658_{1M1}$, . . . , VE $658_{1MK}$, such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, . . . , host operating system $656_{1M}$), while the VMs run multiple applications on various respective guest operating systems. Such flexibility can be facilitated at least in part by a hypervisor (e.g., hypervisor $654_{11}$, . . . , hypervisor $654_{1M}$), which hypervisor is logically located between the various guest operating systems of the VMs and the host operating system of the physical infrastructure (e.g., node).

In other situations, containers are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_{11}$, . . . , host operating system $656_{1M}$) without, in most cases, a hypervisor layer. This lightweight implementation can facilitate efficient distribution of certain software components, such as applications or services (e.g., micro-services). As shown, distributed virtualization environment 6A00 can implement both a hypervisor-assisted virtualization environment and a container virtualization environment for various purposes.

Distributed virtualization environment 6A00 also comprises at least one instance of a virtualized controller to facilitate access to storage pool 170 by the VMs and/or containers. As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 660 which can, among other operations, manage the storage pool 170. This architecture further facilitates efficient scaling of the distributed virtualization system. The foregoing virtualized controllers can be implemented in distributed virtualization environment 6A00 using various techniques. Specifically, an instance of a virtual machine at a given node can be used as a virtualized controller in a hypervisor-assisted virtualization environment to manage storage and I/O activities. In this case, for example, the virtualized entities at node $152_1$ can interface with a controller virtual machine (e.g., virtualized controller $662_{11}$) through hypervisor $654_{11}$ to access the storage pool 170. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to one vendor's software, and a hypervisor at another node in the distributed storage system 660 might correspond to another vendor's software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $152_M$ can access the storage pool 170 by interfacing with a controller container (e.g., virtualized controller $662_{1M}$) through hypervisor $654_{1M}$ and/or the kernel of host operating system $656_{1M}$.

In certain embodiments, one or more instances of a metadata mapping agent can be implemented in the distributed storage system 660 to facilitate the herein disclosed techniques. Specifically, metadata mapping agent $280_1$ can be implemented in the virtualized controller $662_{11}$, and metadata mapping agent $280_M$ can be implemented in the virtualized controller $662_{1M}$. Such instances of the virtualized controller and/or its agents (e.g., metadata mapping agent) can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., metadata mapping agent). In some cases, a virtualized controller in a cluster is selected (e.g., elected as a leader) to serve as an access point for the cluster. In such cases, the instance of the metadata mapping agent associated with the selected virtualized controller might be activated while other instances of the metadata mapping agent in the cluster might be deactivated. According to the herein disclosed techniques, various instances of metadata virtual disks (e.g., metadata vDisks $604_{11}$, . . . , metadata vDisks $604_{1M}$) might be collocated at the nodes with respective instances of data virtual disks (e.g., data vDisks $602_{11}$, . . . , data vDisks $602_{1M}$). A set of distributed metadata might be stored at any location in the storage pool 170.

Figure 6B:
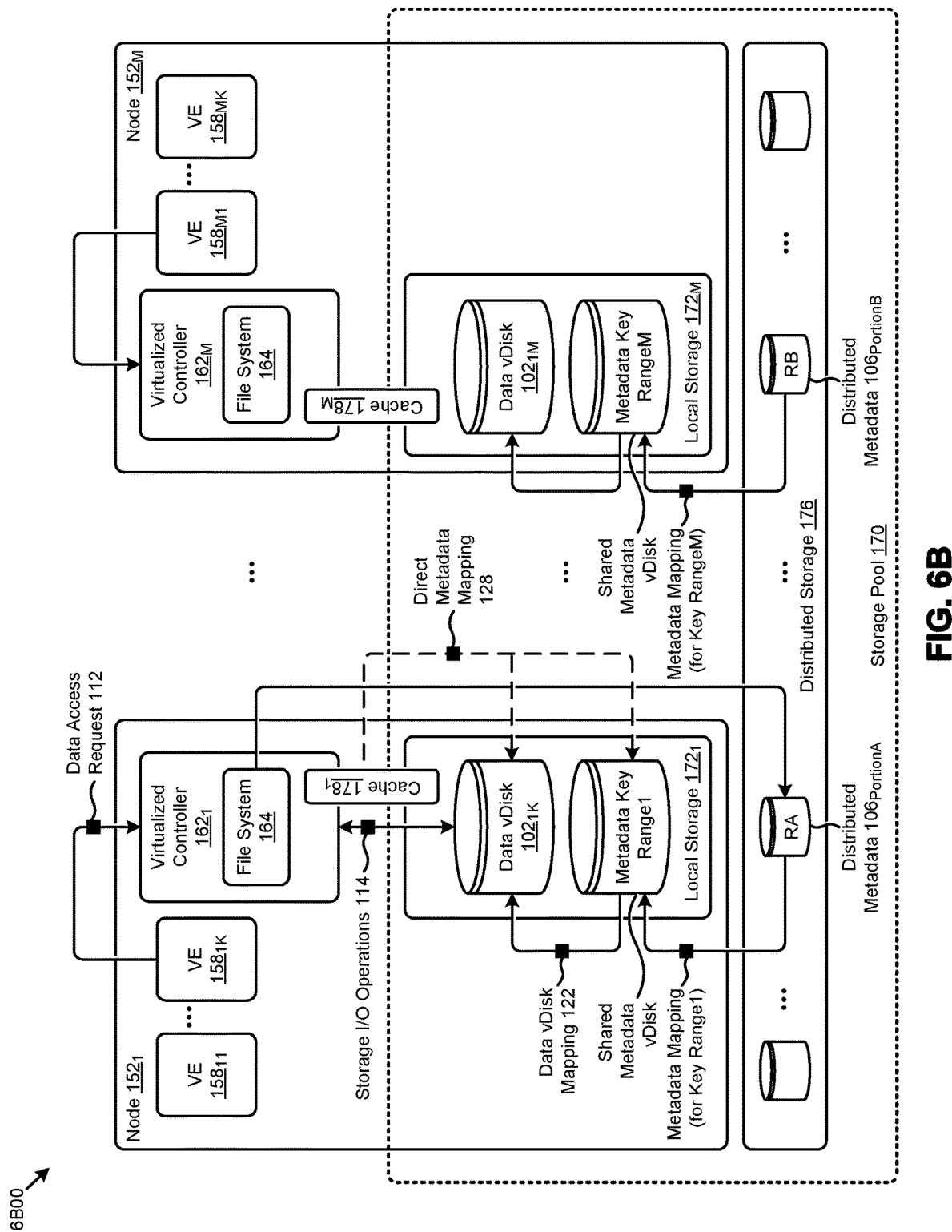
FIG. 6B is a schematic of system showing components that facilitate multi-tiered metadata mapping when using distributed key ranges, according to some embodiments.

FIG. 6B is a schematic showing system components 6B00 that facilitate multi-tiered metadata mapping when using distributed key ranges in distributed computing environments. As shown node $152_1$ hosts a portion of metadata (e.g., the shown metadata key range1) in the metadata vDisk at node $152_1$. The aforementioned portion is a first set of metadata records that are accessed by a first range of keys. Using any known techniques, any set of vDisk metadata can be partitioned into any number of key ranges, according to which ranges the respective portions of the metadata records can be stored at any location in the cluster (e.g., at local storage of a plurality of nodes, or in a storage pool), to be accessed from any other node in the cluster. Access from one node to a particular portion or portions of the metadata records within a particular key range can be facilitated via access through the particular node that hosts the particular portion or portions of the metadata records in its local storage. In some cases, access from a node to a particular portion or portions of the metadata records within a particular key range can be facilitated via access through to the storage pool. In the example shown, a full set of metadata is partitioned into M partitions of M key ranges, and each key range is stored at respective M nodes (e.g., the shown metadata key range1 through metadata key range M). The distributed metadata can be organized into separately-accessible portions as well. In this example, the distributed metadata is divided into distributed metadata $106_{PortionA}$ and distributed metadata $106_{PortionB}$. As shown, the apportioning of the distributed metadata can use a first ranging and apportioning technique, while the apportioning of the metadata key ranges can use a second ranging and apportioning technique. In many cases the metadata vDisks are shared between any processes originating from any node. One such example of such usage occurs in deduplication scenarios, where any process at any node can access a particular range of metadata so as to determine if a particular block or extent of data is in existence. More specifically, keys might be formed of a cyclical redundancy code or hash code for a stored block, and the code or portion thereof can be mapped into a metadata key range.

Figure 6C:
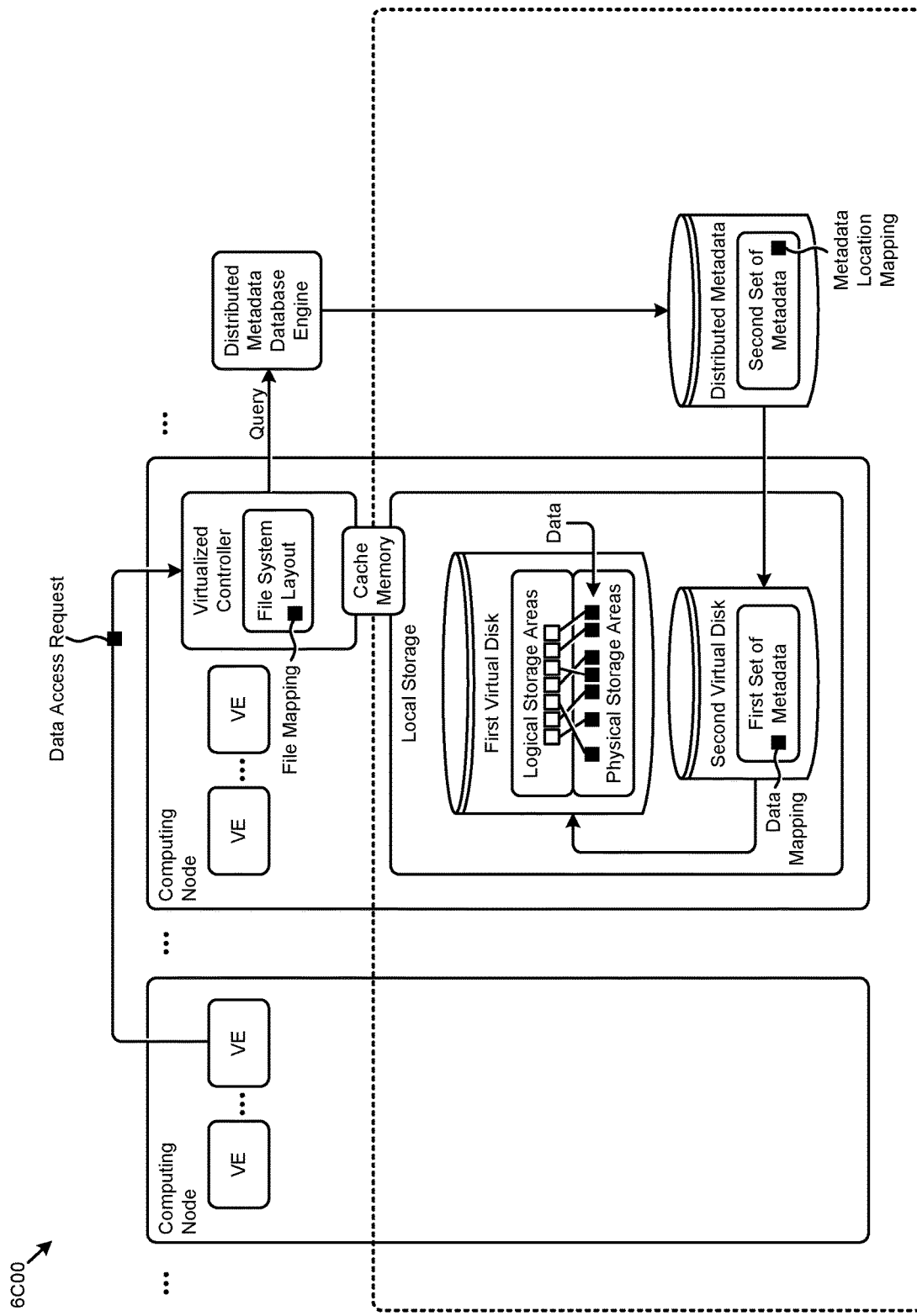
FIG. 6C is a schematic of system components that facilitate multi-tiered metadata mapping in distributed computing environments, according to some embodiments.

FIG. 6C is a schematic of system components 6C00 that facilitate multi-tiered metadata mapping in distributed computing environments. As an option, one or more variations of system components 6C00 or any aspect thereof may be implemented in the context of the architecture and functionality of the embodiments described herein. The system components 6C00 or any aspect thereof may be implemented in any environment.

As depicted in the embodiment shown in FIG. 6C, a first virtual disk comprising one or more logical storage areas associated with a set of data is generated. The data associated with the first virtual disk is stored in one or more physical storage areas at a computing node. A second virtual disk comprising a first set of metadata is also generated. The first set of metadata describes a data mapping between at least one of the logical storage areas and at least one of the physical storage areas. As can be observed, the first set of metadata of the second virtual disk and the data of the first virtual disk are collocated (e.g., in local storage) at the computing node. Further, a second set of metadata is generated (e.g., in a storage pool) to describe a metadata location mapping to a first location of the first set of metadata of the second virtual disk. In the shown embodiment, a file system layout is used to describe a file mapping to the second set of metadata. As shown in FIG. 6C, a cache memory at the computing node is available to store (e.g., for fast re-access) any portions of the first set of metadata and/or any portions of the second set of metadata.

Upon receiving a data access request (e.g., at the shown virtualized controller) that specifies access to a portion of the data of the first virtual disk, the metadata location mapping of the second set of metadata is accessed to determine the first location of the first set of metadata. The data mapping of the first set of metadata at the first location of the first set of metadata is then accessed. The data mapping is employed to access the physical storage areas corresponding to the portion of the data associated with the data access request.

ADDITIONAL EMBODIMENTS OF THE DISCLOSURE

Additional Practical Application Examples

Figure 7:
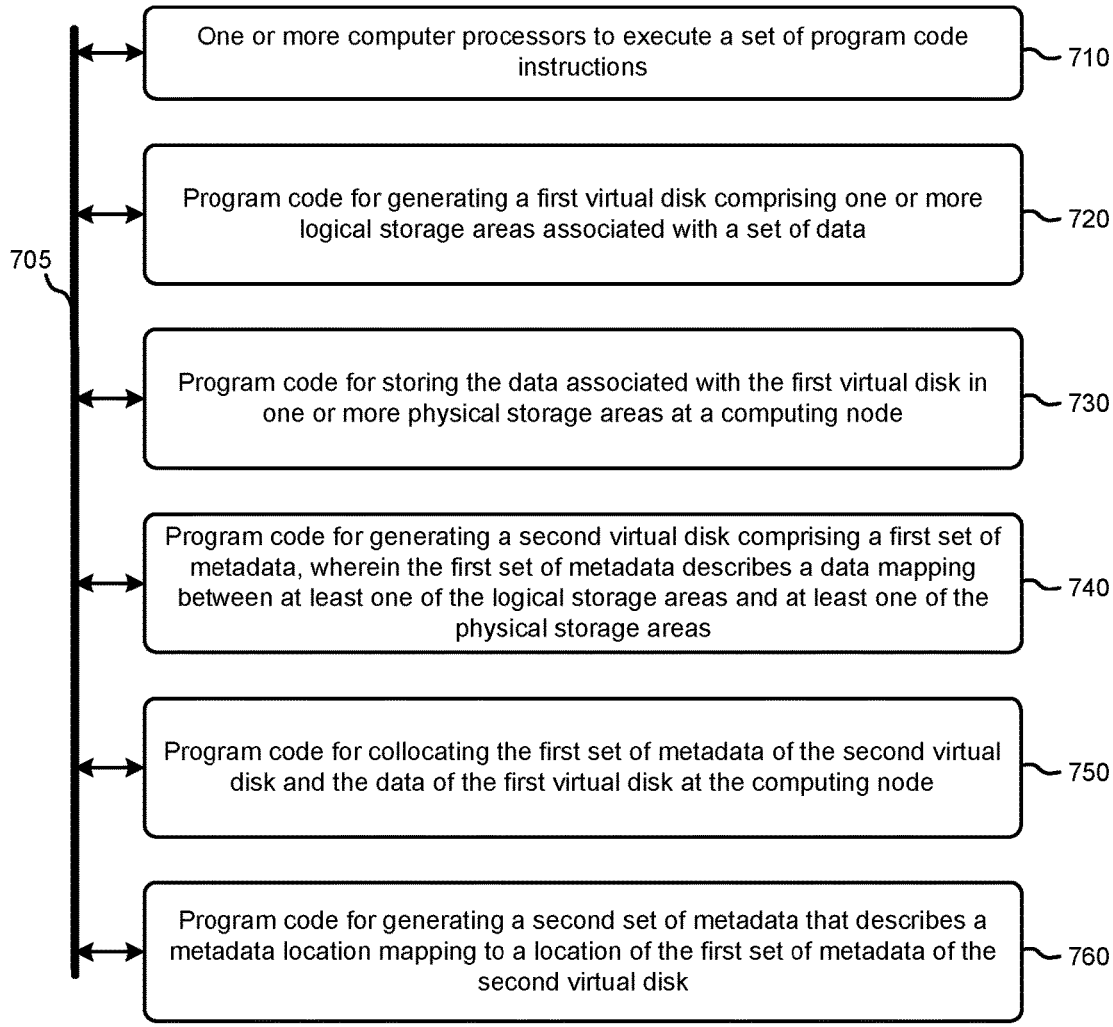
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address efficient access to virtual disk data in a distributed computing environment. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising one or more computer processors to execute a set of program code instructions (module 710) and modules for accessing memory to hold program code instructions to perform: generating a first virtual disk comprising one or more logical storage areas associated with a set of data (module 720); storing the data associated with the first virtual disk in one or more physical storage areas at a computing node (module 730); generating a second virtual disk comprising a first set of metadata, wherein the first set of metadata describes a data mapping between at least one of the logical storage areas and at least one of the physical storage areas (module 740); collocating the first set of metadata of the second virtual disk and the data of the first virtual disk at the computing node (module 750); and generating a second set of metadata that describes a metadata location mapping to a location of the first set of metadata of the second virtual disk (module 760).

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

Some embodiments further comprise (1) receiving a data access request to access a portion of the data of the first virtual disk, (2) accessing the metadata location mapping of the second set of metadata to determine the first location of the first set of metadata (3) accessing the data mapping of the first set of metadata at the first location of the first set of metadata, and (4) employing the data mapping to access the physical storage areas corresponding to the portion of the data associated with the data access request.

Some embodiments further comprise updating the first set of metadata responsive to the data access request.

Some embodiments further comprise (1) writing the portion of the data to a persistent write buffer, and (2) transferring the portion of the data from the persistent write buffer to the physical storage areas corresponding to the portion of the data.

Some embodiments further comprise updating a file system layout to describe a file mapping to the second set of metadata.

Some embodiments implement a mapping technique where the file mapping is codified in an index node data structure.

Some embodiments implement a distribution technique where the second set of metadata comprises a set of database entries that are distributed to a plurality of nodes of a computing system.

Some embodiments implement a distribution technique where the second set of metadata comprises a set of database entries that are distributed over a storage pool.

Some embodiments implement a caching technique where portions of the first set of metadata or the second set of metadata, are stored in a cache memory at a respective computing node.

System Architecture Overview

Additional System Architecture Examples

Figure 8A:
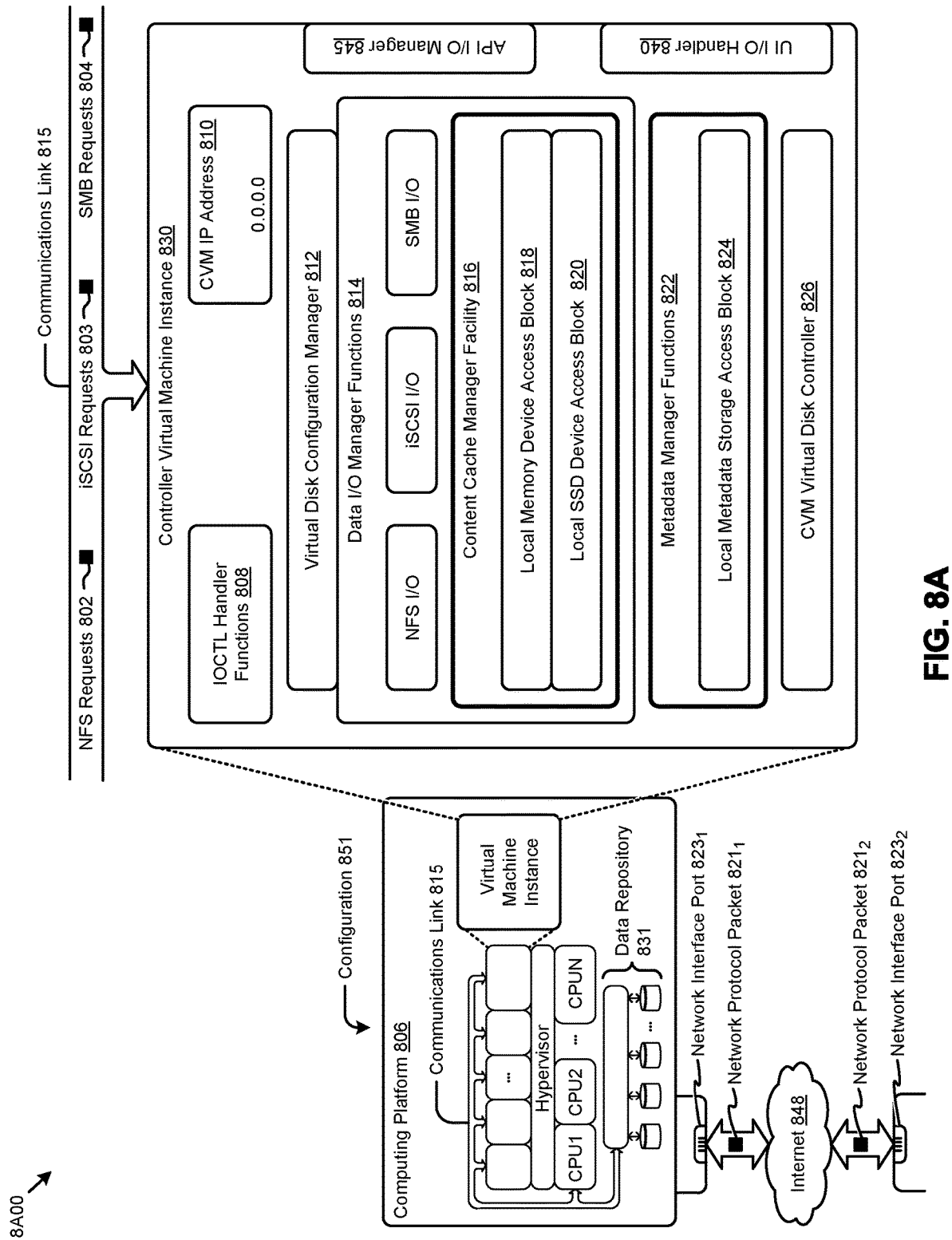
FIG. 8A, FIG. 8B and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB)

requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, ..., CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to multi-tiered metadata mapping in distributed computing environments. In some embodiments, a module may include one or more state machines and/or combinational logic used to implement or facilitate the operational and/or performance characteristics pertaining to multi-tiered metadata mapping in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of multi-tiered metadata mapping in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to multi-tiered metadata mapping in distributed computing environments, and/or for improving the way data is manipulated when performing computerized operations pertaining to implementing a multi-tiered metadata mapping regime comprising a metadata virtual disk that refers to a collocated data virtual disk.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
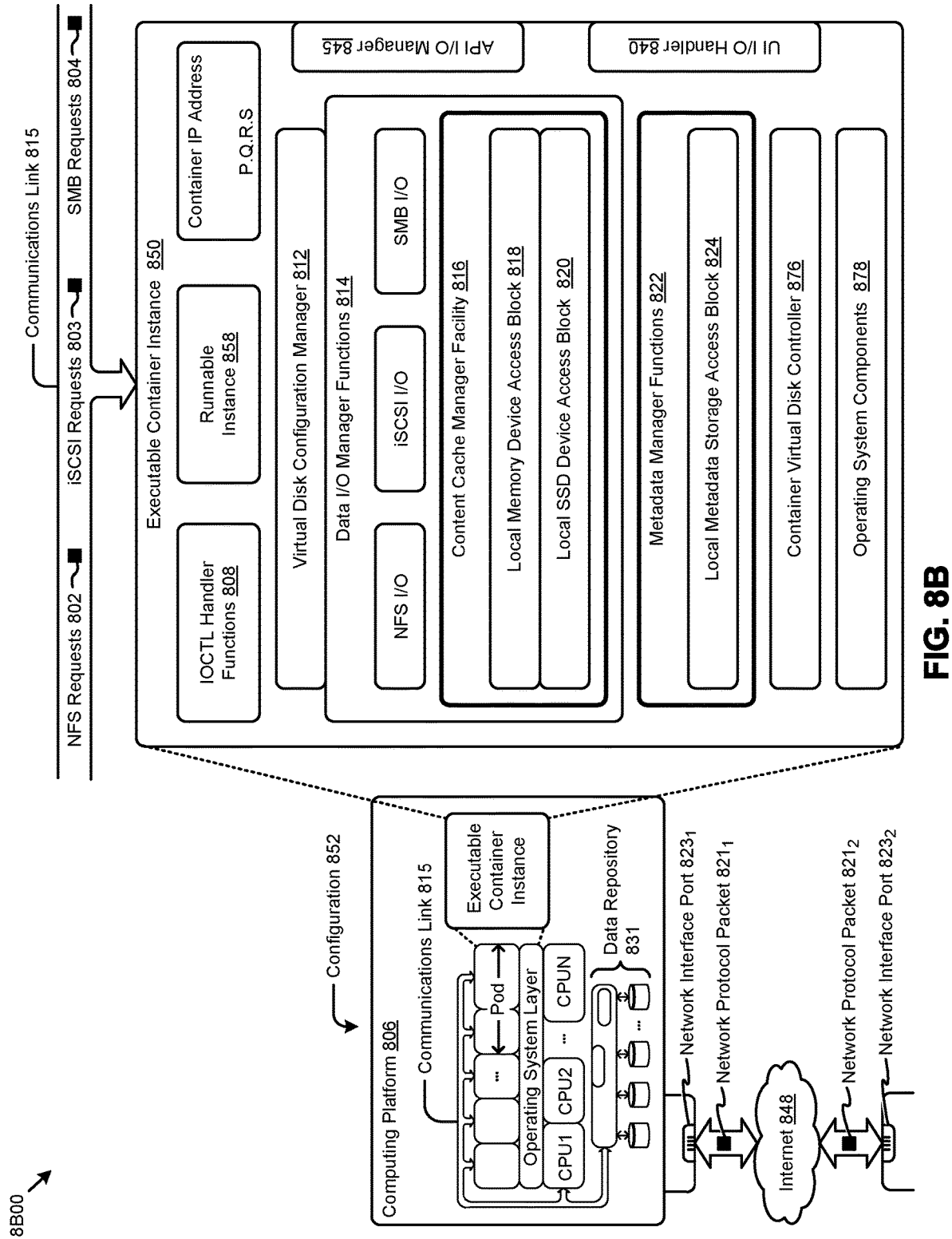

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to the executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
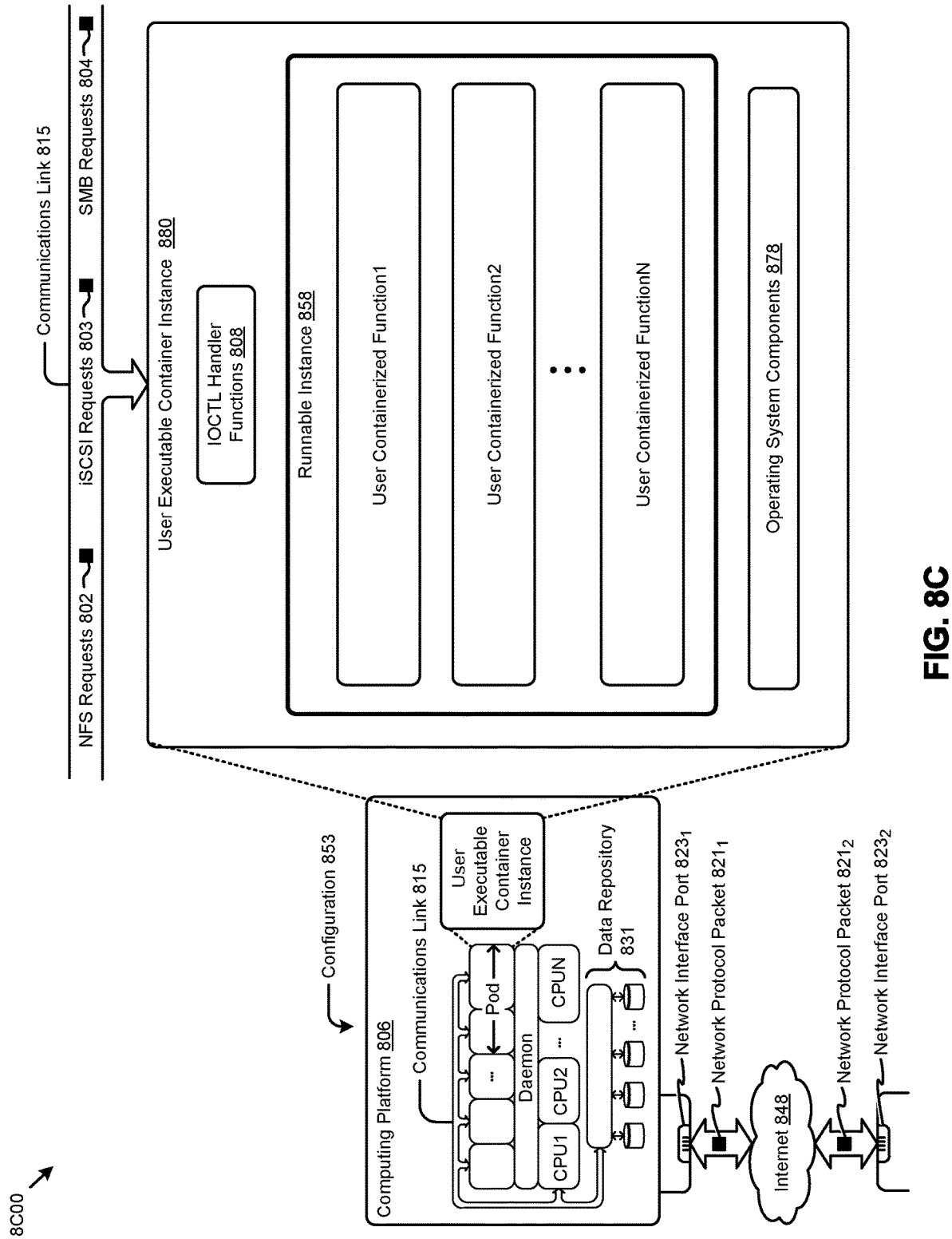

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage, where the tiers of storage might be formed using the shown data repository 831 and/or any forms of network accessible storage. As such, the multiple tiers of storage may include storage that is accessible over the communications link 815. Such network accessible storage may include cloud storage or networked storage (e.g., a SAN or "storage area network"). Unlike prior approaches, the herein-discussed embodiments of a storage pool include local storage that is within or directly attached to the server or node to be managed as part of a storage pool.

Such local storage can include any combinations of the aforementioned SSDs and/or HDDs and/or RAPMs and/or hybrid disk drives. In some cases, the local storage that is within or directly attached to the server or node is directly attached in that the node does not communicate over the communications link 815 when accessing local storage. In many cases, the local storage is local to the node because the storage devices that comprise the local storage are on the same motherboard that forms the node, or in the same chassis as the node, or in the same rack as the node, or in the same data center as the node. The node can still access certain network-attached storage over the communications link 815, which network-attached storage might be located in a different geography or located on the far side of a public switched network such as the Internet. The distributed metadata store as discussed herein often shards a key-value pair across many nodes organized into a ring. Each node hosts a one or more of the shards (e.g., an assigned shard as well as a shard from that node's previous ring-wise neighbor node and a shard from that node's next ring-wise neighbor node). Any of the nodes of the ring might be geographically collocated, or might be geographically distant from another node of the ring, or any combination of local neighbor nodes and/or distal neighbor nodes.

The address spaces of a plurality of storage devices, including both local storage (e.g., using at least one node-internal, locally-attached storage device) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual, since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments a vDisk is mountable. In some embodiments a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster. The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
   generating a first virtual disk, the first virtual disk being a storage area that is a logical view of corresponding physical storage;
   providing access to the first virtual disk through a first computing node;
   identifying the first computing node as being associated with the first virtual disk, wherein the first virtual disk is on the first computing node;
   in response to identifying the first computing node as being associated with the first virtual disk, generating a second virtual disk on the first computing node, the second virtual disk comprising a first set of metadata that is a logical view of the first virtual disk;
   providing access to the second virtual disk through the first computing node;
   and
   accessing the first virtual disk at a storage area referred to by the first set of metadata in the second virtual disk.

2. The method of claim 1, wherein the first set of metadata is part of a distributed metadata database, where portions of metadata are distributed across a plurality of computing nodes.

3. The method of claim 2, further comprising caching a portion of the first set of metadata at a second computing node of the plurality of computing nodes.

4. The method of claim 1, wherein a virtual entity is provided access to the first virtual disk using the first set of metadata on the second virtual disk.

5. The method of claim 1, wherein at least the first set of metadata comprises a type indication to determine if the first set of metadata refers to a data virtual disk or to a metadata virtual disk.

6. The method of claim 1, wherein a second set of metadata is distributed over a plurality of storage devices of a storage pool.

7. The method of claim 1, wherein at least a portion of the first set of metadata is stored in a cache memory at a second computing node.

8. The method of claim 1, further comprising determining an access location of the second virtual disk by accessing a database or by querying a database engine that manages a second set of metadata pertaining to at least the second virtual disk to retrieve at least a portion of the second set of metadata using a database entry comprises at least an access location of the second virtual disk.

9. The method of claim 8, further comprising accessing the first set of metadata at a storage area referred to by the second set of metadata.

10. A non-transitory computer readable medium having stored thereon a sequence of instructions which, when executed causes a set of acts, the set of acts comprising:
    generating a first virtual disk, the first virtual disk being a storage area that is a logical view of corresponding physical storage;
    providing access to the first virtual disk through a first computing node;
    identifying the first computing node as being associated with the first virtual disk, wherein the first virtual disk is on the first computing node;
    in response to identifying the first computing node as being associated with the first virtual disk, generating a second virtual disk on the first computing node, the second virtual disk comprising a first set of metadata that is a logical view of the first virtual disk;
    providing access to the second virtual disk through the first computing node;
    and
    accessing the first virtual disk at a storage area referred to by the first set of metadata in the second virtual disk.

11. The computer readable medium of claim 10, wherein the first set of metadata is part of a distributed metadata database, where portions of metadata are distributed across a plurality of computing nodes.

12. The computer readable medium of claim 11, the set of acts further comprising caching a portion of the first set of metadata at a second computing node of the plurality of computing nodes.

13. The computer readable medium of claim 10, wherein a virtual entity is provided access to the first virtual disk using the first set of metadata on the second virtual disk.

14. The computer readable medium of claim 10, wherein at least the first set of metadata comprises a type indication to determine if the first set of metadata refers to a data virtual disk or to a metadata virtual disk.

15. The computer readable medium of claim 10, wherein a second set of metadata is distributed over a plurality of storage devices of a storage pool.

16. The computer readable medium of claim 10, wherein at least a portion of the first set of metadata is stored in a cache memory at a second computing node.

17. The computer readable medium of claim 10, further comprising determining an access location of the second virtual disk by accessing a database or by querying a database engine that manages a second set of metadata pertaining to at least the second virtual disk to retrieve at least a portion of the second set of metadata using a database entry comprises at least an access location of the second virtual disk.

18. The computer readable medium of claim 17, further comprising accessing the first set of metadata at a storage area referred to by the second set of metadata.

19. A system, comprising:
a storage medium having stored thereon a sequence of instructions; and
a processor that executes the sequence of instructions to to perform a set of acts, the set of acts comprising,
generating a first virtual disk, the first virtual disk being a storage area that is a logical view of corresponding physical storage;
providing access to the first virtual disk through a first computing node;
identifying the first computing node as being associated with the first virtual disk, wherein the first virtual disk is on the first computing node;
in response to identifying the first computing node as being associated with the first virtual disk, generating a second virtual disk on the first computing node, the second virtual disk comprising a first set of metadata that is a logical view of the first virtual disk;
providing access to the second virtual disk through the first computing node; and
accessing the first virtual disk at a storage area referred to by the first set of metadata in the second virtual disk.

20. The system of claim 19, wherein the first set of metadata is part of a distributed metadata database, where portions of metadata are distributed across a plurality of computing nodes.

21. The system of claim 19, wherein at least the first set of metadata comprises a type indication to determine if the first set of metadata refers to a data virtual disk or to a metadata virtual disk.

22. The system of claim 19, wherein a second set of metadata is distributed over a plurality of storage devices of a storage pool.

23. The system of claim 22, further comprising determining an access location of the second virtual disk by accessing a database or by querying a database engine that manages a second set of metadata pertaining to at least the second virtual disk to retrieve at least a portion of the second set of metadata using a database entry comprises at least an access location of the second virtual disk.

24. The system of claim 23, further comprising accessing the first set of metadata at a storage area referred to by the second set of metadata.

* * * * *